United States Patent
Krenzer

[11] 3,890,342
[45] June 17, 1975

[54] 2-ALKYL-4-ARYL-1,2,4-TRIAZOLIDIN-3-ONES

[75] Inventor: John Krenzer, Oak Park, Ill.

[73] Assignee: Velsicol Chemical Corporation, Chicago, Ill.

[22] Filed: Mar. 28, 1974

[21] Appl. No.: 455,710

[52] U.S. Cl............ 260/308 C; 71/92; 260/453 A; 260/554
[51] Int. Cl............................................. C07d 55/06
[58] Field of Search ................................ 260/308 C

[56] References Cited
UNITED STATES PATENTS
3,514,466   5/1970   Stahle et al. .................. 260/308 C

*Primary Examiner*—Alton D. Rollins
*Attorney, Agent, or Firm*—Robert J. Schwarz; Dietmar H. Olesch

[57] ABSTRACT

This invention discloses compounds of the formula

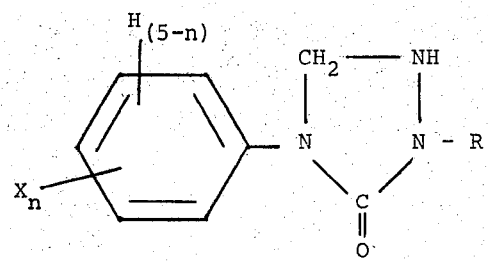

wherein X is selected from the group consisting of alkyl, alkoxy, alkylthio, halogen, haloalkyl and nitro; $n$ is an integer from 1 to 3; and R is alkyl. Further disclosed are herbicidal compositions containing a compound of the above description.

6 Claims, No Drawings

2-ALKYL-4-ARYL-1,2,4-TRIAZOLIDIN-3-ONES

This invention relates to new compositions of matter and more specifically relates to new chemical compounds of the formula

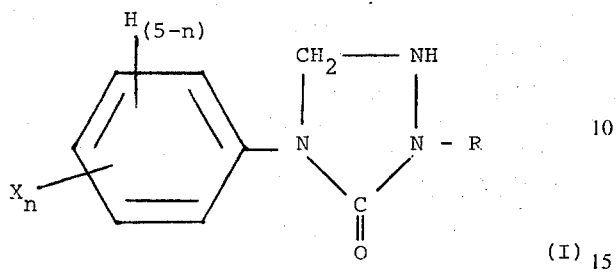

wherein X is selected from the group consisting of alkyl, alkoxy, alkylthio, halogen, haloalkyl and nitro; n is an integer from 1 to 3; and R is alkyl.

The compounds of this invention are unexpectedly useful as herbicides.

In a preferred embodiment of this invention X is selected from the group consisting of lower alkyl, lower alkoxy, lower alkylthio, halogen, chloroalkyl, trifluoromethyl and nitro; and R is lower alkyl.

The term lower as used herein designates a straight or branched carbon chain of up to six carbon atoms.

The compounds of this invention can be prepared by reacting a semicarbazide of the formula

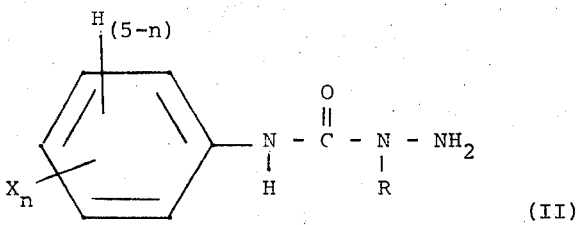

wherein X, n and R are as heretofore described, with formaldehyde. This reaction can be effected by combining a solution of a molar amount of the semicarbazide of formula II in a water miscible solvent such as methanol with an about equimolar or slight excess molar amount of aqueous formaldehyde. Inorganic base such as potassium hydroxide can be added to raise the pH of the reaction medium to from about 7 to about 9. This reaction can be carried out at room temperature or at slightly elevated temperatures such as temperatures ranging up to about 50°C. The reaction mixture can then be stirred or allowed to stand for a period of up to about 8 hours to ensure completion of the reaction and to precipitate solid product. The solid can then be recovered by filtration and can be dried to yield the desired product. This product can be used as such or can be further purified by conventional means such as recrystallization, washing and the like.

The semicarbazide of formula II can be prepared by reacting a molar amount of an isocyanate of the formula

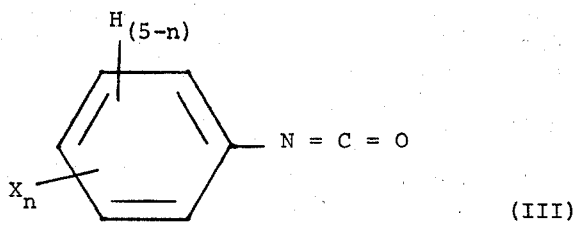

wherein X and n are as heretofore described, with an about equimolar or excess molar amount of a hydrazine of the formula

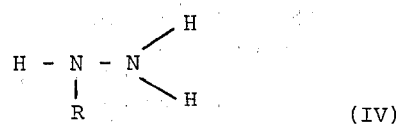

wherein R is as heretofore described. This reaction can be effected by combining a solution of the isocyanate of formula III in an inert aromatic solvent such as benzene or methylene chloride with a solution of the hydrazine of formula IV in an inert organic solvent such as benzene or methylene chloride. The reaction mixture can be maintained at a temperature of from about −20° to about 30°C with stirring for a period of up to about 1 hour. After this time additional solvent can be added and the reaction mixture can be optionally heated at reflux for a period of up to about 2 hours to ensure completion of the reaction. The reaction mixture can then be filtered to recover the solid product which has formed. This desired product can then be used as such or can be further purified by convention· means such as recrystallization and the like.

Exemplary suitable hydrazines of formula IV for preparing the compounds of the present invention are methylhydrazine, ethylhydrazine, propylhydrazine, isopropylhydrazine, n-butylhydrazine, sec-butylhydrazine, t-butylhydrazine, pentylhydrazine, hexylhydrazine and the like.

Exemplary isocyanates useful for preparing the compounds of the present invention are 2-methylphenyl isocyanate, 3-ethylphenyl isocyanate, 4-propylphenyl isocyanate, 4-butylphenyl isocyanate, 4-pentylphenyl isocyanate, 4-hexylphenyl isocyanate, 3-methoxyphenyl isocyanate, 2-ethoxyphenyl isocyanate, 4-propoxyphenyl isocyanate, 4-hexyloxyphenyl isocyanate, 2-methylthiophenyl isocyanate, 3-ethylthiophenyl isocyanate, 4-pentylthiophenyl isocyanate, 3-chlorophenyl isocyanate, 4-bromophenyl isocyanate, 3,4-dichlorophenyl isocyanate, 3,4,5-trichlorophenyl isocyanate, 4-iodophenyl isocyanate, 4-fluorophenyl isocyanate, 3-β-bromoethylphenyl isocyanate, 4-trichloromethylphenyl isocyanate, 4-trifluoromethylphenyl isocyanate, 2,6-dinitrophenyl isocyanate, 4-nitrophenyl isocyanate, 2-methyl-4-chlorophenyl isocyanate and the like.

The manner in which the compounds of the present invention can be prepared is more specifically illustrated in the following examples.

EXAMPLE 1

Preparation of
2-Methyl-4-(3-chlorophenyl)semicarbazide

A solution of methylhydrazine (8.6 grams) in methylene chloride (100 ml) was charged into a glass reaction vessel equipped with a mechanical stirrer and thermometer. The solution was cooled to a temperature of about 10°C and 3-chlorophenyl isocyanate (30 grams) was added with stirring resulting in the formation of a solid precipitate. The precipitate was recovered by filtration and was dried to yield the desired product 2-methyl-4-(3-chlorophenyl)semicarbazide.

EXAMPLE 2

Preparation of
2-Methyl-4-(3-chlorophenyl)-1,2,4-triazolidin-3-one

2-Methyl-4-(3-chlorophenyl)semicarbazide (10 grams), aqueous formaldehyde (6 ml; 37% concentration) and methanol (50 ml) were charged into a glass beaker at room temperature. Dilute aqueous potassium hydroxide was added to adjust the pH of the reaction medium to about 8. The mixture was stirred until homogeneous and allowed to stand for a period of about 6 hours. After this time the reaction mixture was stripped of water and methanol leaving a solid residue. The residue was then recrystallized from a water-acetone mixture to yield the desired product 2-methyl-4-(3-chlorophenyl)-1,2,4-triazolidin-3-one having a melting point of 62° to 63°C.

EXAMPLE 3

Preparation of
2-Methyl-4-(3,4-dichlorophenyl)semicarbazide

A solution of methylhydrazine (12.1 grams) in benzene (100 ml) and a solution of 3,4-dichlorophenyl isocyanate (50 grams) in benzene (150 ml) were charged into a glass reaction vessel equipped with a mechanical stirrer, thermometer and reflux condenser. The reaction mixture was stirred and the temperature was maintained between about 20° and 25°C with cooling for a period of one half hour. After this time additional benzene (500 ml) was added to the reaction mixture and the mixture was heated to reflux. The mixture was then cooled and filtered to recover the solid product formed. The solid was then dried to yield the desired product 2-methyl-4-(3,4-dichlorphenyl)semicarbazide having a melt point of from 134° to 138°C.

EXAMPLE 4

Preparation of
2-Methyl-4-(3,4-dichlorophenyl)-1,2,4-triazolidin-3-one

2-Methyl-4-(3,4-dichlorophenyl)semicarbazide (12 grams), aqueous formaldehyde (5 ml; 37% concentration) and methanol (100 ml) were charged into a glass reaction vessel at room temperature. Dilute aqueous potassium hydroxide was added to adjust the pH of the reaction mixture to about 8. The mixture was stirred and allowed to stand for a period of about 2 hours. After this time the reaction mixture was stripped of water and methanol under vacuum to yield a solid. The solid was recrystallized from heptane to yield the desired product 2-methyl-4-(3,4-dichlorophenyl)-1,2,4-triazolidin-3-one having a melting point of 77° to 79°C.

EXAMPLE 5

Preparation of
2-Methyl-4-(2-methoxyphenyl)semicarbazide

A solution of methylhydrazine (0.2 mole) in benzene (100 ml) is charged into a glass reaction vessel equipped with a mechanical stirrer and thermometer. The solution is cooled to a temperature of about 10°C and a solution of 2-methoxyphenyl isocyanate (0.2 mole) in benzene (100 ml) is added with stirring. After the addition is completed stirring is continued for a period of about 30 minutes. After this time the reaction mixture is stripped of solvent under reduced pressure to yield the desired product 2-methyl-4-(2-methoxyphenyl)semicarbazide as the residue.

EXAMPLE 6

Preparation of
2-Methyl-4-(2-methoxyphenyl)-1,2,4-triazolidin-3-one

2-Methyl-4-(2-methoxyphenyl)semicarbazide (0.1 mole), aqueous formaldehyde (0.1 mole; 37% concentration) and methanol (100 ml) are charged into a glass reaction vessel at room temperature. Dilute aqueous potassium hydroxide is added to adjust the pH of the reaction mixture to about 8. The mixture is stirred and then allowed to stand for a period of about 6 hours. After this time the reaction mixture is stripped of water and methanol leaving a solid residue. The residue is then recrystallized to yield the desired product 2-methyl-4-(2-methoxyphenyl)-1,2,4-triazolidin-3-one.

EXAMPLE 7

Preparation of
2-Methyl-4-(4-methylthiophenyl)semicarbazide

A solution of methylhydrazine (0.2 mole) in benzene (100 ml) is charged into a glass reaction vessel equipped with a mechanical stirrer and thermometer. The solution is cooled to a temperature of about 10°C and a solution of 4-methylthiophenyl isocyanate (0.2 mole) in benzene (100 ml) is added with stirring. After the addition is completed stirring is continued for a period of about 30 minutes. After this time the reaction mixture is stripped of solvent under reduced pressure to yield the desired product 2-methyl-4-(4-methylthiophenyl)semicarbazide as the residue.

EXAMPLE 8

Preparation of
2-Methyl-4-(4-methylthiophenyl)-1,2,4-triazolidin-3-one

2-Methyl-4-(4-methylthiophenyl)semicarbazide (0.1 mole), aqueous formaldehyde (0.1 mole; 37% concentration) and methanol (100 ml) are charged into a glass reaction vessel at room temperature. Dilute aqueous potassium hydroxide is added to adjust the pH of the reaction mixture to about 8. The mixture is stirred and then allowed to stand for a period of about 6 hours. After this time the reaction mixture is stripped of water and methanol leaving a solid residue. The residue is then recrystallized to yield the desired product 2-methyl-4-(4-methylthiophenyl)-1,2,4-triazolidin-3-one.

EXAMPLE 9

Preparation of
2-Ethyl-4-(4-bromophenyl)semicarbazide

A solution of ethylhydrazine (0.2 mole) in benzene (100 ml) is charged into a glass reaction vessel equipped with a mechanical stirrer and thermometer. The solution is cooled to a temperature of about 10°C and a solution of 4-bromophenyl isocyanate (0.2 mole) in benzene (100 ml) is added with stirring. After the addition is completed stirring is continued for a period of about 30 minutes. After this time the reaction mixture is stripped of solvent under reduced pressure to yield the desired product 2-ethyl-4-(4-bromophenyl)-semicarbazide as the residue.

EXAMPLE 10

Preparation of
2-Ethyl-4-(4-bromophenyl)-1,2,4-triazolidin-3-one

2-Ethyl-4-(4-bromophenyl)semicarbazide (0.1 mole), aqueous formaldehyde (0.1 mole; 37% concentration) and methanol (100 ml) are charged into a glass reaction vessel at room temperature. Dilute aqueous potassium hydroxide is added to adjust the pH of the reaction mixture to about 8. The mixture is stirred and then allowed to stand for a period of about 6 hours. After this time the reaction mixture is stripped of water and methanol leaving a solid residue. The residue is then recrystallized to yield the desired product 2-ethyl-4-(4-bromophenyl)-1,2,4-triazolidin-3-one.

EXAMPLE 11

Preparation of
2-Methyl-4-(2-methyl-4-chlorophenyl)semicarbazide

A solution of methylhydrazine (0.2 mole) in benzene (100 ml) is charged into a glass reaction vessel equipped with a mechanical stirrer and thermometer. The solution is cooled to a temperature of about 10°C and a solution of 2-methyl-4-chlorophenyl isocyanate (0.2 mole) in benzene (100 ml) is added with stirring. After the addition is completed stirring is continued for a period of about 30 minutes. After this time the reaction mixture is stripped of solvent under reduced pressure to yield the desired product 2-methyl-4-(2-methyl-4-chlorophenyl)semicarbazide as the residue.

EXAMPLE 12

Preparation of
2-Methyl-4-(2-methyl-4-chlorophenyl)-1,2,4-triazolidin-3-one

2-Methyl-4-(2-methyl-4-chlorophenyl)semicarbazide (0.1 mole), aqueous formaldehyde (0.1 mole; 37% concentration) and methanol (100 ml) are charged into a glass reaction vessel at room temperature. Dilute aqueous potassium hydroxide is added to adjust the pH of the reaction mixture to about 8. The mixture is stirred and then allowed to stand for a period of about 6 hours. After this time the reaction mixture is stripped of water and methanol leaving a solid residue. The residue is then recrystallized to yield the desired product 2-methyl-4-(2-methyl-4-chlorophenyl)-1,2,4-triazolidin-3-one.

EXAMPLE 13

Preparation of
2Methyl-4-(4-trifluoromethylphenyl)semicarbazide

A solution of methylhydrazine (0.2 mole) in benzene (100 ml) is charged into a glass reaction vessel equipped with a mechanical stirrer and thermometer. The solution is cooled to a temperature of about 10°C and a solution of 4-trifluoromethylphenyl isocyanate (0.2 mole) in benzene (100 ml) is added with stirring. After the addition is completed stirring is continued for a period of about 30 minutes. After this time the reaction mixture is stripped of solvent under reduced pressure to yield the desired product 2-methyl-4-(4-trifluoromethylphenyl)semicarbazide as the residue.

EXAMPLE 14

Preparation of
2-Methyl-4-(4-trifluoromethylphenyl)-1,2,4-triazolidin-3-one

2-Methyl-4-(4-trifluoromethylphenyl)semicarbazide (0.1 mole), aqueous formaldehyde (0.1 mole; 37% concentration) and methanol (100 ml) are charged into a glass reaction vessel at room temperature. Dilute aqueous potassium hydroxide is added to adjust the pH of the reaction mixture to about 8. The mixture is stirred and then allowed to stand for a period of about 6 hours. After this time the reaction mixture is stripped of water and methanol leaving a solid residue. The residue is then recrystallized to yield the desired product 2-methyl-4-(4-trifluoromethylphenyl)-1,2,4-triazolidin-3-one.

EXAMPLE 15

Preparation of
2-Methyl-4-(4-nitrophenyl)semicarbazide

A solution of methylhydrazine (0.2 mole) in benzene (100 ml) is charged into a glass reaction vessel equipped with a mechanical stirrer and thermometer. The solution is cooled to a temperature of about 10°C and a solution of 4-nitrophenyl isocyanate (0.2 mole) in benzene is added with stirring. After the addition is completed stirring is continued for a period of about 30 minutes. After this time the reaction mixture is stripped of solvent under reduced pressure to yield the desired product 2-methyl-4-(4-nitrophenyl)semicarbazide as the residue.

EXAMPLE 16

Preparation of
2-Methyl-4-(4-nitrophenyl)-1,2,4-triazolidin-3-one

2-Methyl-4-(4-nitrophenyl)semicarbazide (0.1 mole), aqueous formaldehyde (0.1 mole; 37% concentration) and methanol (100 ml) are charged into a glass reaction vessel at room temperature. Dilute aqueous potassium hydroxide is added to adjust the pH of the reaction mixture to about 8. The mixture is stirred and then allowed to stand for a period of about 6 hours. After this time the reaction mixture is stripped of water and methanol leaving a solid residue. The residue is then recrystallized to yield the desired product 2-methyl-4-(4-nitrophenyl)-1,2,4-triazolidin-3-one.

Additional compounds within the scope of the present invention and which can be prepared by the procedures detailed in the foregoing examples are 2-methyl-4-(3-ethylphenyl)-1,2,4-triazolidin-3-one, 2-ethyl-4-(4-propylphenyl)-1,2,4-triazolidin-3-one, 2-propyl-4-(3-pentylphenyl)-1,2,4-triazolidin-3-one, 2-butyl-4-(4-hexylphenyl)-1,2,4-triazolidin-3-one, 2-hexyl-4-(2,6-dimethylphenyl)-1,2,4-triazolidin-3-one, 2-methyl-4-(3-ethoxyphenyl)-1,2,4-triazolidin-3-one, 2-methyl-4-(4-butoxyphenyl)-1,2,4-triazolidin-3-one, 2-isopropyl-4-(4-hexyloxyphenyl)-1,2,4-triazolidin-3-one, 2-t-butyl-4-(3-chloromethylphenyl)-1,2,4-triazolidin-3-one, 2-methyl-4-(4-β-chloroethylphenyl)-1,2,4-triazolidin-3-one, 2-methyl-4-(4-β-bromoethylphenyl)-1,2,4-triazolidin-3-one, 2-methyl-4-(3,4-dibromophenyl)-1,2,4-triazolidin-3-one, 2-methyl-4-(4-fluorophenyl)-1,2,4-triazolidin-3-one, 2-methyl-4-(4-iodophenyl)-1,2,4-triazolidin-3-one, 2-methyl-4-(2,4,5-trichlorophenyl)-1,2,4-triazolidin-3-one, 2-methyl-4-(2-ethylthiophenyl)-1,2,4-triazolidin-3-one, 2-methyl-4-(3-propylthiophenyl)-1,2,4-triazolidin-3-one, 2-methyl-4-(4-butylthiophenyl)-1,2,4-triazolidin-3-one and 2-methyl-4-(4-hexylthiophenyl)-1,2,4-triazolidin-3-one.

For practical use as herbicides the compounds of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides can be dispersed under super-atmospheric pressure as aerosols. However, preferred liquid herbicidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water in oil) can be prepared for direct application to weed infestations.

A typical herbicidal composition according to this invention is illustrated by the following example, in which the quantities are in parts by weight.

EXAMPLE 19

Preparation of a Dust

| Product of Example 2 | 10 |
| Powdered Talc | 90 |

The above ingredients are mixed in a mechanical grinder-blender and are ground until a homogeneous, free-flowing dust of the desired particle size is obtained. The dust is suitable for direct application to the site of the weed infestation.

The compounds of this invention can be applied as herbicides in any manner recognized by the art. One method for the control of weeds comprises contacting the locus of said weeds with a herbicidal composition comprising an inert carrier and as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the acitve compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers, spreaders, deactivators, adhesives, stickers, fertilizers, activators, synergists, and the like.

The compounds of the present invention are also useful when combined with other herbicides and/or defoliants, dessicants, growth inhibitors, and the like in the herbicidal compositions heretofore described. These other materials can comprise from about 5 to about 95% of the active ingredients in the herbicidal compositions. Use of combinations of these other herbicides and/or defoliants, dessicants, etc. with the compounds of the present invention provide herbicidal compositions which are more effective in controlling weeds and often provide results unattainable with separate compositions of the individual herbicides. The other herbicides, defoliants, dessicants and plant growth inhibitors, with which the compounds of this invention can be used in the herbicidal compositions to control weeds, can include chlorophenoxy herbicides such as 2,4-D, 2,4,5-T, MCPA, MCPB, alachlor, 4(2,4-DB), 2,4-DEB, 4-CPB, 4-CPA, 4-CPP, 2,4,5-TB, 2,4,5-TES, 3,4-DA, silvex and the like; carbamate herbicides such as IPC, CIPC, swep, barban, BCPC, CEPC, CPPC, and the like; thiocarbamate and dithiocarbamate herbicides such as CDEC, metham sodium, EPTC, diallate, PEBC, perbulate, vernolate and the like; substituted urea herbicides such as norea, siduron, dichloral urea, chloroxuron, cycluron, fenuron, monuron, monuron TCA, diuron, linuron, monolinuron, neburon, buturon, trimeturon and the like; symmetrical triazine herbicides such as simazine, chlorazine, atraone, desmetryne, norazine, ipazine, prometryn, atazine, trietazine, simetone, prometone, propazine, ametryne and the like; chloroacetamide herbicides such as alpha-chloro-N, N-dimethylacetamide, CDEA, CDAA, alpha-chloro-N-isopropylacetamide, 2-chloro-N-isopropylacetanilide, 4-(chloroacetyl)morpholine, 1-(chloroacetyl)-piperidine, and the like; chlorinated aliphatic acid herbicides such as TCA, dalapon, 2,3-dichloropropionic acid, 2,2,3-TPA and the like; chlorinated benzoic acid and phenylacetic acid herbicides such as 2,3,6-TBA, 2,3,5,6-TBA, tricamba, amiben, fenac, PBA, 2-methoxy-3,6-dichlorophenylacetic acid, 3-methoxy-2,6-dichlorophenylacetic acid, 2-methoxy-3,5,6-trichlorophenylacetic acid, 2,4-dichloro-3-nitrobenzoic acid and the like; and such compounds as aminotriazole, maleic hydrazide, phenyl mercuric acetate, endothal, biuret, technical chlordane, dimethyl 2,3,5,6-tetrachloroterephthalate, diquat, erbon, DNC, DNBP, dichlobenil, DPA, diphenamid, dipropalin, trifluralin, solan, dicryl, merphos, DMPA, DSMA, MSMA, potassium azide, acrolein, benefin, bensulide, AMS, bromacil, 2-(3,4-dichlorophenyl)-4-methyl-1,2,4-oxadiazolidine-3,5-dione, bromoxynil, cacodylic acid, CMA, CPMF, cypromid, DCB, DCPA, dichlone, diphenatril, DMTT, DNAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, brominil, CP-50144, H-176-1, H-732, M-2901, planavin, sodium tetraborate, calcium cyanamid, DEF, ethyl xanthogen disulfide, sindone, sindone B, propanil and the like.

Such herbicides can also be used in the methods and compositions of this invention in the form of their salts, esters, amides, and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, field pennycress, ryegrass, goose-grass, chickweed, wild oats, velvetleaf, purslane, barnyard grass, smartweed, knotweed, cocklebur, wild buckwheat, kochia, medic, corn cockle, ragweed, sowthistle, coffeeweed, croton, cuphea, dodder, fumitory, groundsel, hemp nettle, knawel, spurge, spurry, emex, jungle rice, pondweed, dog fennel, carpetweed, morning glory, bedstraw, ducksalad, naiad, cheatgrass, fall panicum, jimsonweed, witchgrass, switchgrass, watergrass, teaweed, wild turnip and sprangletop; biennials such as wild carrot, matricaria, wild barley, campion, chamomile, burdock, mullein, roundleaved mallow, bull thistle, hounds-tongue, moth mullein and purple star thistle; or perennials such as white cockle, perennial ryegrass, quackgrass, Johnson grass, Canada thistle, hedge bindweed, Bermuda grass, sheep sorrel, curly dock, nutgrass, field chickweed, dandelion, campanula, field bindweed, Russian knapweed, mesquite, toadflax, yarrow, aster, gromwell, horsetail, ironweed, sesbania, bulrush, cattail, wintercress, horsenettle, nutsedge, milkweed and sicklepod.

Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The exact amount of compound required will depend on a variety of factors, including the hardiness of the particular weed species, weather, type of soil, method of application, the kind of beneficial plants in the same area, and the like. Thus, while the application of up to only about 1 or 2 ounces of active compound per acre may be sufficient for good control of a light infestation of weeds growing under adverse conditions, the application of 10 pounds or more of an active compound per acre may be required for good control of a dense infestation of hardy perennial weeds growing under favorable conditions.

The herbicidal toxicity of the new compounds of this invention can be illustrated by many of the established testing techniques known to the art, such as pre- and post- emergence testing.

The herbicidal activity of the compounds of this invention was demonstrated by experiments carried out for the pre-emergence control of a variety of weeds. In these experiments small plastic greenhouse pots filled with dry soil were seeded with the various weed seeds. Twenty-four hours or less after seeding the pots were sprayed with water until the soil was wet and the test compounds formulated as aqueous emulsions of acetone solutions containing emulsifiers were sprayed at the indicated concentrations on the surface of the soil.

After spraying, the soil containers were placed in the greenhouse and provided with supplementary heat as required and daily or more frequent watering. The plants were maintained under these conditions for a period of from 15 to 21 days, at which time the condition of the plants and the degree of injury to the plants was rated on a scale of from 0 to 10, as follows: 0 = no injury, 1,2 = slight injury, 3,4 = moderate injury, 5,6 = moderately severe injury, 7,8,9 = severe injury and 10 = death. The effectiveness of these compounds is demonstrated by the following data:

TABLE I

| Weed Species | Product of Example 4 Concentration (lbs./acre) | | | | Product of Example 2 Concentration (lbs./acre) | | | |
|---|---|---|---|---|---|---|---|---|
| | 10 | 2 | 1 | ¼ | 10 | 4 | 2 | 1 |
| Yellow Nutsedge | 0 | — | — | — | 0 | — | — | — |
| Wild Oats | 3 | — | — | — | 8 | 2 | 0 | 0 |
| Jimsonweed | 10 | 1 | 0 | 0 | 9 | 1 | 0 | 0 |
| Velvetleaf | 10 | 3 | 1 | 0 | 9 | 2 | 0 | 0 |
| Johnsongrass | 8 | 1 | 0 | 0 | 8 | 0 | 0 | 0 |
| Pigweed | 10 | 8 | 5 | 2 | 7 | 4 | 0 | 0 |
| Mustard | 10 | 3 | 1 | 0 | 10 | 0 | 0 | 0 |
| Yellow Foxtail | 10 | 1 | 0 | 0 | 5 | 0 | 0 | 0 |
| Barnyardgrass | 10 | 7 | 0 | 0 | 7 | 1 | 1 | 0 |
| Crabgrass | 10 | 6 | 4 | 0 | 10 | 5 | 0 | 0 |
| Cheatgrass | 9 | 7 | 0 | 0 | 10 | 1 | 0 | 0 |
| Morningglory | 0 | — | — | — | 6 | 0 | 0 | 0 |

The herbicidal activity of the compounds of this invention was also demonstrated by experiments carried out for the post-emergence control of a variety of weeds. In these experiments the compounds to be tested were formulated as aqueous emulsions and sprayed at the indicated dosage on the foliage of the weeds that have attained a prescribed size. After spraying the plants were placed in a greenhouse and watered daily or more frequently. Water was not applied to the foliage of the treated plants. The severity of the injury was determined 10 to 15 days after treatment and was rated on the scale of from 0 to 10 heretofore described. The effectiveness of these compounds is demonstrated by the following data:

TABLE II

| | Injury Rating | | | | | | | |
|---|---|---|---|---|---|---|---|---|
| | Product of Example 4 Concentration (lbs./acre) | | | | Product of Example 2 Concentration (lbs./acre) | | | |
| Weed Species | 10 | 2 | 1 | ¼ | 10 | 2 | 1 | ¼ |
| Yellow Nutsedge | 2 | — | — | — | 10 | 0 | 0 | 0 |
| Wild Oats | 10 | 9 | 4 | 2 | 10 | 2 | 0 | 0 |
| Jimsonweed | 10 | 10 | 10 | 9 | 10 | 10 | 8 | 3 |
| Velvetleaf | 10 | 10 | 10 | 9 | 10 | 7 | 4 | 1 |
| Johnsongrass | 10 | 10 | 8 | 9 | 10 | 3 | 1 | 0 |
| Bindweed | 10 | 4 | 2 | 1 | 6 | — | — | — |
| Mustard | 10 | 10 | 10 | 9 | 10 | 9 | 5 | 2 |
| Yellow Foxtail | 10 | 9 | 8 | 4 | 10 | 2 | 0 | 0 |
| Barnyardgrass | 10 | 10 | 9 | 4 | 10 | 3 | 2 | 0 |
| Crabgrass | 10 | 10 | 10 | 10 | 10 | 7 | 1 | 0 |
| Morningglory | 10 | 5 | 4 | 1 | 10 | 4 | 1 | 0 |

I claim:

1. A compound of the formula

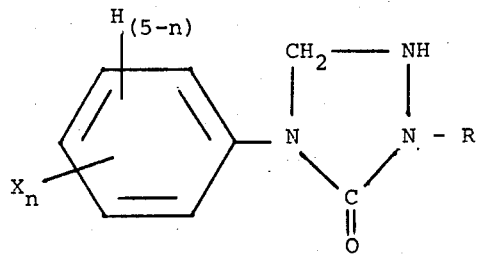

wherein X is selected from the group consisting of lower alkyl, lower alkoxy, lower alkylthio, halogen, halo lower alkyl and nitro; $n$ is an integer from 1 to 3; and R is lower alkyl.

2. The compound of claim 1, 2-ethyl-4-(4-bromophenyl)-1,2,4-triazolidin-3-one.

3. The compound of claim 1, 2-methyl-4-(3-chlorophenyl)-1,2,4-triazolidin-3-one.

4. The compound of claim 1, 2-methyl-4-(3,4-dichlorophenyl)-1,2,4-triazolidin-3-one.

5. The compound of claim 1, 2-methyl-4-(2-methoxyphenyl)-1,2,4-triazolidin-3-one.

6. The compound of claim 1, 2-methyl-4-(4-methylthiophenyl)-1,2,4-triazolidin-3-one.

* * * * *